(12) United States Patent
Ruston

(10) Patent No.: US 7,930,928 B2
(45) Date of Patent: Apr. 26, 2011

(54) METHOD FOR DETECTING OVERPRESSURE INSIDE A COMPARTMENT ASSOCIATED WITH A GAS TURBINE NACELLE

(75) Inventor: Simon M. Ruston, Derby (GB)

(73) Assignee: Rolls-Royce PLC, London (GB)

( * ) Notice: Subject to any disclaimer, the term of this patent is extended or adjusted under 35 U.S.C. 154(b) by 151 days.

(21) Appl. No.: 12/457,749

(22) Filed: Jun. 19, 2009

(65) Prior Publication Data

US 2010/0043540 A1    Feb. 25, 2010

(30) Foreign Application Priority Data

Aug. 20, 2008  (GB) .................................. 0815127.6

(51) Int. Cl.
*G01M 15/14*      (2006.01)
(52) U.S. Cl. .................. 73/112.01; 73/112.06
(58) Field of Classification Search ............. 73/112.01, 73/112.03, 112.05, 112.06
See application file for complete search history.

(56) References Cited

U.S. PATENT DOCUMENTS

| 4,505,150 | A | * | 3/1985 | Seymour et al. ........... 73/112.06 |
| 4,507,915 | A | * | 4/1985 | Evans ......................... 60/39.281 |
| 5,012,637 | A | * | 5/1991 | Dubin et al. ..................... 60/773 |
| 5,051,918 | A |   | 9/1991 | Parsons |
| 5,726,891 | A | * | 3/1998 | Sisson et al. .................. 701/100 |
| 6,502,085 | B1 | * | 12/2002 | Adibhatla et al. .............. 706/52 |

FOREIGN PATENT DOCUMENTS

EP          1 114 991 A2    7/2001

* cited by examiner

*Primary Examiner* — Freddie Kirkland, III
(74) *Attorney, Agent, or Firm* — Oliff & Berridge, PLC

(57) ABSTRACT

A method, for detecting overpressure inside a compartment associated with a gas turbine nacelle, includes: a) measuring one or more predetermined operating conditions nominally affecting the temperature inside the compartment; b) determining a reference temperature for the compartment, corresponding to a nominal reference zone pressure, on the basis of the measured operating condition or conditions; c) measuring the actual temperature inside the compartment, corresponding to the actual compartment pressure; and d) using the measured actual temperature in the compartment and the determined reference temperature for the compartment to assess the gas pressure inside the compartment. A system for assessing the gas pressure inside the compartment caused by an associated pressure system failure includes using a quantified mass leakage flow to assess gas pressure inside the compartment. The quantified mass leakage flow may also be used to detect excessive mass leakage flow by comparing the quantified mass leakage flow with a predetermined mass flow leakage.

20 Claims, 3 Drawing Sheets

METHOD FOR DETECTING OVERPRESSURE INSIDE A COMPARTMENT ASSOCIATED WITH A GAS TURBINE NACELLE

BACKGROUND

The present invention relates to a method for detecting overpressure inside a compartment associated with a gas turbine nacelle, including so-called "fire zones" formed by a fan nacelle or a core nacelle surrounding a jet engine in an aircraft.

Gas turbines may be provided with a nacelle. In aerospace applications in particular, it is common for a gas turbine engine to be fitted with one or more such nacelles.

By way of example, FIG. 1 shows a simplified cross-sectional overview of a typical turbofan engine 1 in a civil aircraft.

The engine 1 is supported inside two nacelles: an inner, core nacelle 2 which surrounds the engine core 1a, and an outer, hollow-wall fan nacelle (or "fancase") 3 which surrounds the by-pass fan 1b. The outer surface of the core nacelle 2 and the inner surface of the fan nacelle 3 together define an annular fan discharge passageway 4 for the respective bypass jet from the bypass fan 1b.

In order to limit the spread of a fire throughout the respective nacelle structure, each nacelle in a gas turbine engine will typically be designed so that it forms one or more associated fire containment compartments, or "fire zones".

FIG. 1 shows a typical configuration of fire zones in a civil aerospace application.

Thus, the fan nacelle 3 includes a single fire zone, conventionally designated as "Zone 1", in the form of a fancase compartment 5 enclosed between respective fireproof bulkheads 6, 7 inside the hollow-wall of the fan nacelle 3.

In the case of the core nacelle 2 there are two fire zones, conventionally designated "Zone 2" and "Zone 3", which are in the form of first and second core compartments 8,9 defined between the inner surface of the nacelle 2 and the outer surface of the engine core 1a. The core compartments 8, 9 are separated from one another by a fireproof bulkhead 10 extending between the inner surface of the nacelle 2 and the outer surface of the engine core 1a.

Conventionally, each fire zone is cooled and ventilated by air being passed around the engine and vented overboard. Thus, fan compartment 5 includes an inlet 5a (represented symbolically by a flow direction arrow in FIG. 1) for receiving air from the atmosphere and a respective outlet 5b for venting air to the atmosphere, the first core compartment 8 includes an inlet 8a for receiving air from the fan discharge passageway 4 and a respective outlet 8b for venting air back into the fan discharge passageway 4, and the second compartment similarly includes an inlet 9a which receives air from the fan discharge passageway and an outlet 9b for venting this air to atmosphere.

Cooling and venting of the fire zones helps continually purge the zone of flammable vapour and also regulates the temperature inside the zone to help reduce the possibility of fire ignition.

In addition to the provision and arrangement of fire zones within the nacelle structure, each nacelle will additionally be protected by a fire warning system, being either a dedicated nacelle system or, particularly in the case of Zone 2 and Zone 3, forming part of a larger Fire Detection System (FDS) for the engine 1.

The respective fire warning system typically utilises a network of local temperature sensors around the nacelle to detect a fire-critical overheating within the nacelle structure. In the case of the FDS, this will normally trigger a fire alarm message in the cockpit, and the flight manual will then instruct the aircrew to take suitable "reversionary" action, for example throttling back on the engine and possibly shutting down one or more auxiliary engine systems, in order to limit the temperatures within the nacelle as far as possible.

SUMMARY

A problem associated with nacelles is that of "overpressure", where failure in an associated pressure system causes an increase in pressure inside the nacelle, potentially leading to a "burst condition" and consequent breach of the nacelle.

The problem of nacelle overpressure due to a pressure system fault is a particular concern in nacelles for aircraft engines, because each nacelle often encloses high pressure systems incorporating high pressure air ducts and valves, and these tend specifically to be housed within the relatively confined space of a compartment representing a respective fire zone. For example, in the case of fan compartment 5 in FIG. 1, this will often house high pressure ducts forming part of a hot air anti-icing system for the respective air intake lip, whilst the core compartments 8 might enclose IP bleed valves associated with the intermediate pressure (IP) stage of the engine core 1a. Failure of one of these high pressure ducts or valves may lead very quickly to a critical overpressure situation inside the respective compartment.

Although regulation of pressure inside the compartments 5, 8 and 9 can be achieved to a certain extent by appropriate dimensioning of the respective ventilation outlets 5b, 8b and 9b, there are practical limits on the discharge duty which can be achieved for the ventilation outlets 5b, 8b, 9b. At the same time, the respective fire warning system will not activate until such time as the associated fire zone temperature actually represents a critical fire-risk.

In practice therefore for a given fire zone, there may be an overpressure detection "gap" whereby a given leakage mass flow into a fire zone may be sufficiently high to "choke" the respective ventilation outlet and cause critical overpressure within the fire zone, but the temperature is nevertheless insufficient to trigger the respective fire-warning system.

In order to compensate for this detection "gap", the respective engine structure is conventionally designed to withstand high pressure load fatigue caused by "undetected" but critical nacelle overpressure, at the cost of significant added weight throughout the forward core structure of the engine.

According to the present invention there is provided a method for detecting overpressure inside a compartment associated with a gas turbine nacelle, the method including:
a) measuring one or more predetermined operating conditions nominally affecting the temperature inside the compartment;
b) determining a reference temperature for the compartment, corresponding to a nominal reference zone pressure, on the basis of the measured operating condition or conditions;
c) measuring the actual temperature inside the compartment, corresponding to the actual compartment pressure; and
d) using the measured actual temperature in the compartment and the determined reference temperature for the compartment to assess the gas pressure inside the compartment.

The method may include repeating the above steps a) to d) at intervals during said operating period for monitoring the gas pressure inside the compartment, during the operating period.

The operating condition or operating conditions may include one or more of the ambient atmospheric temperature and the gas turbine operating point.

The reference temperature may be a temperature threshold, and assessing the gas pressure inside the compartment may then include determining whether the measured actual temperature exceeds the temperature threshold.

In one embodiment, there is provided a method for detecting overpressure inside the compartment on the basis of failure in a given pressure system, wherein the method includes determining an operating temperature for the pressure system and wherein assessing the gas pressure inside the compartment includes quantifying mass leakage flow on the basis of said reference temperature, said actual temperature and said operating temperature for the pressure system, and subsequently using the quantified mass leakage flow to determine a gas pressure inside the compartment.

The operating temperature may be a duct gas temperature in the case where the pressure system includes one or more ducts. Determining the duct temperature may include measuring one or more operating conditions nominally affecting the duct temperature and determining a nominal duct temperature on the basis of the operating condition or conditions. Alternatively, determining the duct temperature may include measuring the actual duct temperature.

Data relating to the quantified mass leakage and/or determined gas pressure may be stored for subsequent retrieval, which may include, for example, measured compartment temperatures and/or determined operating conditions, cross-referenced where appropriate.

Where the gas pressure has been determined, the method may include assessing whether the determined gas pressure exceeds a threshold overpressure.

If the actual temperature or determined pressure exceeds the respective threshold, a signal may be generated for prompting reversionary action to reduce the compartment pressure. The demand on the gas turbine may then be reduced in response to said signal, possibly below a second threshold level.

The signal may include a control signal inputted to a respective control unit, which control unit consequently controls said reduction in the demand in accordance with said control signal.

The signal may include an alarm signal which triggers a respective alarm.

The actual compartment temperature may be measured at or upstream of a ventilation outlet in the compartment.

The compartment may be a gas turbine fire zone.

According to another aspect of the following invention, there is provided a method of performing a maintenance check on a gas turbine following an operating period, the method including retrieving data stored in accordance with the present invention during the operating period, and using said data for fault diagnosis.

According to a yet further aspect of the present invention, there is provided a method of scheduling a maintenance check on a gas turbine including retrieving data stored in accordance with the present invention and scheduling said maintenance on the basis of said retrieved data.

According to a yet further aspect of the present invention, there is provided a gas turbine including apparatus for carrying out the method of the present invention.

BRIEF DESCRIPTION OF THE DRAWINGS

Embodiments of the invention will now be described, by way of example, with additional reference to the remaining drawings, in which.

DETAILED DESCRIPTION OF EMBODIMENTS

Figure 1:
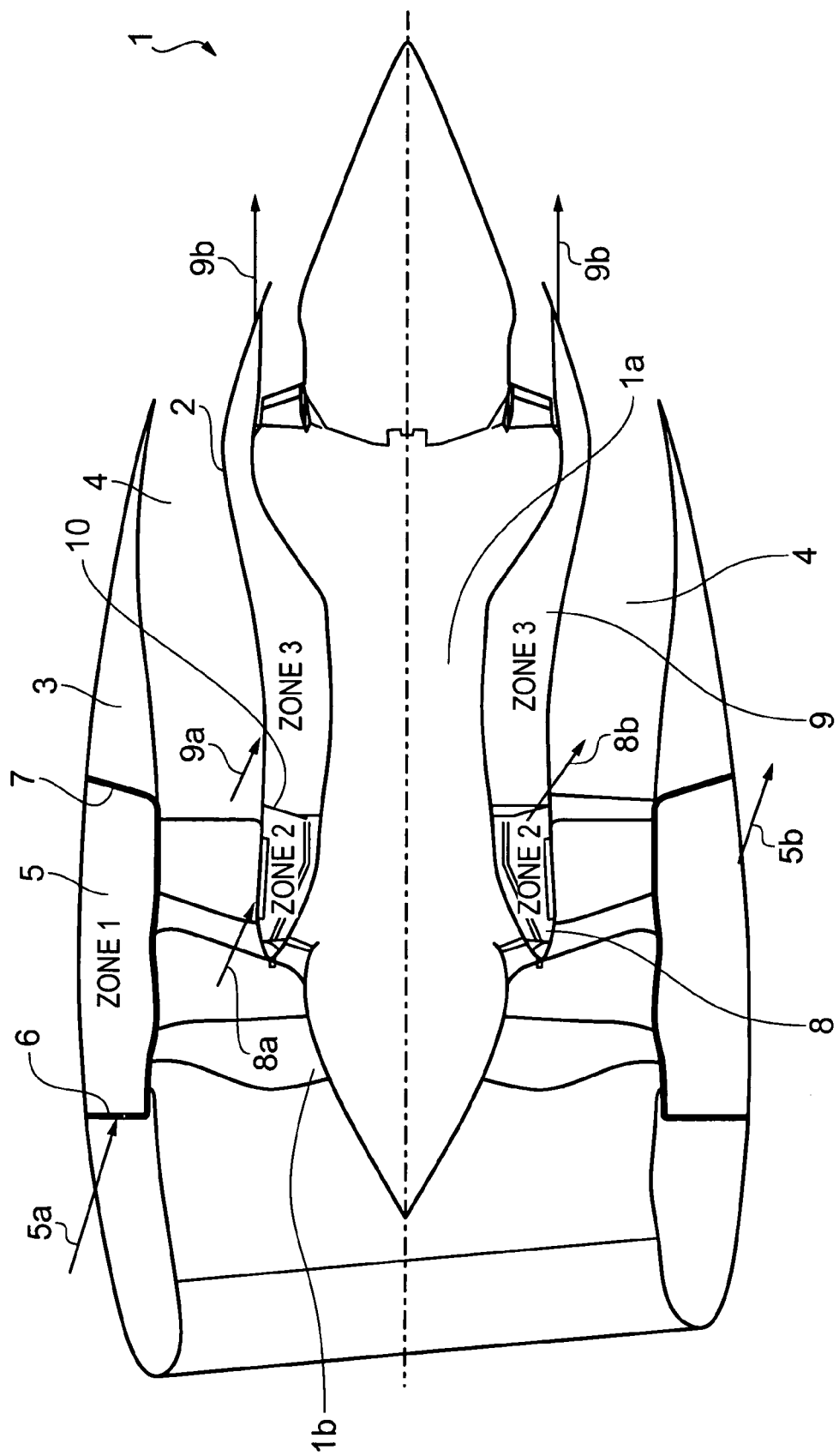
FIG. 1 shows a simplified cross-sectional overview of a typical turbofan engine 1 in a civil aircraft.
Figure 2:
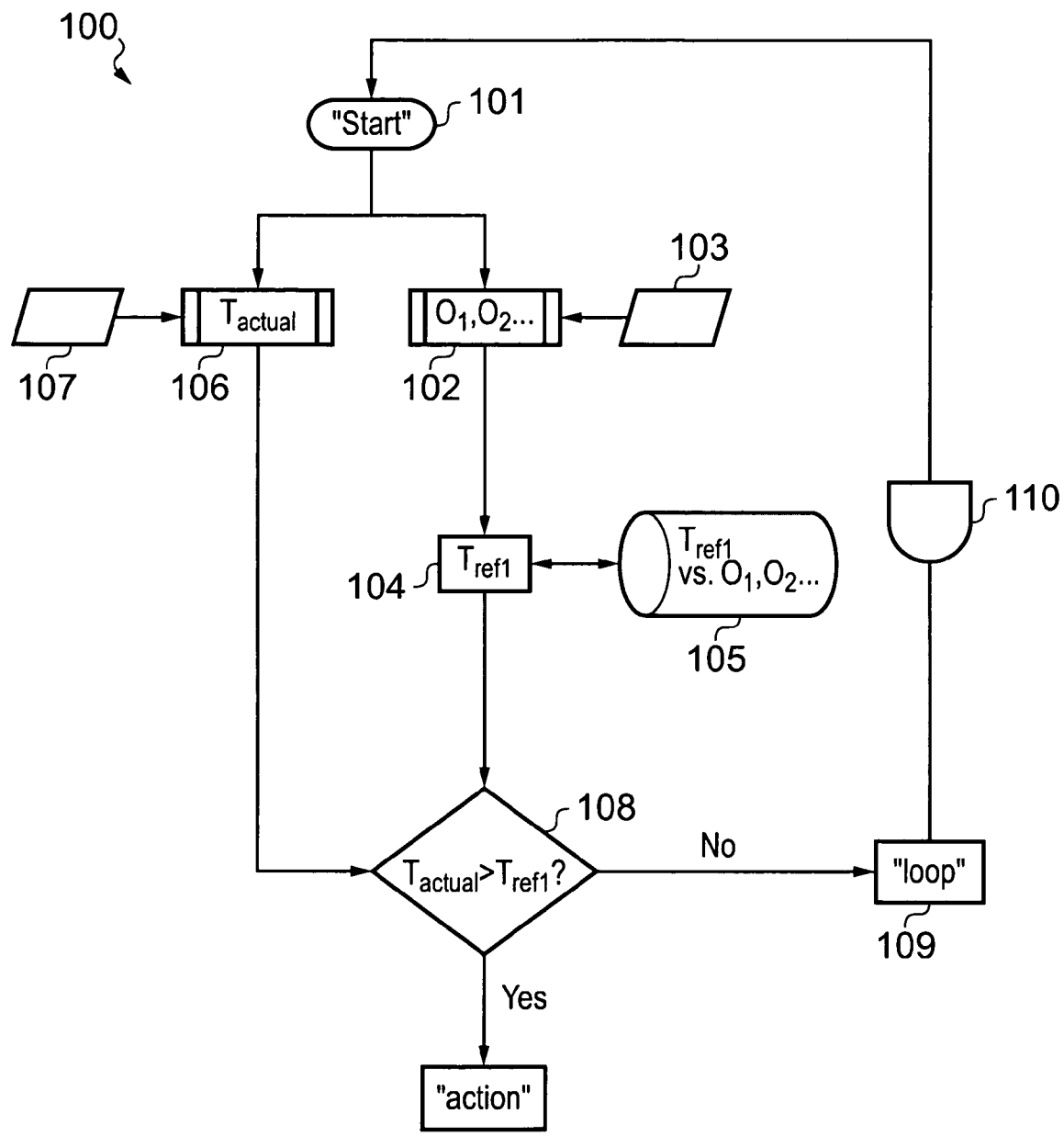
FIG. 2 is a flowchart which illustrates a method according to a first embodiment of the invention.

FIG. 2 illustrates a method 100 which may be implemented in a gas turbine application, such as the turbofan engine 1 of FIG. 1, in order to monitor the pressure inside a designated compartment for detecting an overpressure inside the compartment. Following detection of an overpressure, the method 100 additionally prompts mitigating action in order to reduce said overpressure inside the compartment with the intention of avoiding a "burst condition" developing in the compartment.

It is envisaged that the method 100 will be implemented using a suitably configured processor or set of "distributed" processors. Each processor may be a dedicated processor, or may be shared with some other system forming part of the gas turbine.

The method 100 is as follows:

A "Start" command is issued by a processor at step 101.

Following issue of the "Start" command, at step 102 a processor is used to determine one or more operating conditions $O_1, O_2 \ldots$ on the basis of a corresponding sensor input 103.

Each operating condition is a condition having a nominal effect on the temperature inside the designated gas turbine compartment, which may be predetermined from test and/or in-service data. In general, such operating conditions may include the atmospheric temperature of the ambient environment, and the gas turbine operating point. In the case of an aerospace application, such as the fan compartment 5 in turbofan engine 1 for example, the operating conditions might include one or more parameters defining the "flight condition" ie the position in the relevant operational envelope, including for example the altitude and speed of the aircraft, in addition to the engine operating point.

The sensor input 103 may be an input signal or a series of input signals, either from an individual sensor or from a plurality or network of sensors, depending upon the particular predetermined operating condition or conditions.

Each sensor may be a dedicated sensor or, alternatively, may be a sensor shared with some other external system for the gas turbine. For example, it is envisaged that one or more temperature sensors forming part of the Fire Detection System (FDS) in the engine 1 in FIG. 1 may additionally be used to provide a sensor input 103 for use in the method 100.

At step 104, a reference temperature $T_{ref1}$ for the designated compartment (e.g. fan compartment 5) is determined in the form of a temperature threshold, which is retrieved from a suitable "look up" table 105 based on the specific operating condition or conditions determined at step 102.

The reference temperature may be calculated using a suitable algorithm rather than being retrieved from a look-up table.

The temperature threshold may be a temperature predetermined to be indicative of a critical overpressure inside the specific compartment under those specific measured operating conditions, based on suitable prior test data and/or in-service data. Alternatively, the temperature threshold may be predetermined to indicate a sub-critical overpressure within the specific compartment, say 50% above the nominal compartment pressure.

In addition to determining the reference temperature $T_{ref1}$, at step 106 a processor is used to determine the actual temperature ($T_{actual}$) inside the designated compartment, on the basis of suitable sensor input signals 107 from one or more temperature sensors associated with the designated compartment, which again may be dedicated temperature sensors or may be shared with some other system.

The temperature sensors used to measure the actual temperature inside the compartment may be positioned in the region of a ventilation outlet of the compartment ie immediately upstream, at or immediately downstream of the outlet. The airflow exiting through a ventilation outlet will generally be well mixed and hence at a uniform temperature corresponding to the "bulk" temperature inside the compartment; therefore, it is envisaged that positioning the temperature sensors in the region of a ventilation outlet, false readings due to localised hotspots inside the compartment may be reduced.

Conventional arrangement of the sensors and suitable signal processing may be used to limit or further limit the effects of localised hotspots on the measured temperature for the designated compartment where appropriate.

According to method 100, the gas pressure inside the designated compartment is then assessed on the basis of the measured actual temperature relative to the respective reference temperature.

Thus, at step 108, a processor is used to compare the actual temperature measured at step 106 with the reference temperature determined at step 104 in order to determine whether or not the measured temperature exceeds the reference temperature.

If the measured temperature does not exceed the reference temperature, indicative of the pressure inside the designated compartment being within threshold overpressure limits, then a "loop" signal is generated at step 109 for prompting reissue of the "Start" command in FIG. 2 after a time delay 110. In this sense, the method 100 can be used to intermittently monitor the pressure inside the compartment, for example during a predetermined operating period for the respective gas turbine.

The time delay 110 may be determined by a processor in accordance with a predetermined sample rate. The sample rate will generally be predetermined according to the application. In safety critical applications, for example in the turbofan engine 1, a relatively high sample rate may be used with the intention of minimising potential exposure of the fan compartment 5 or core compartments 8,9 to a "burst condition".

If on the other hand the measured temperature is determined to exceed the reference temperature at step 108, indicative of an overpressure inside the compartment exceeding the predetermined threshold limit, then an "action" signal is generated at step 111 for prompting reversionary action to mitigate the effect of the detected overpressure inside the designated compartment.

The "action" signal may trigger an alarm (audible or otherwise) for prompting external intervention. For example, in the case of turbofan engine 1, the "action" signal may trigger a cockpit alarm (audible or otherwise) alerting the aircrew, who may then take suitable reversionary action, including throttling back on the engine and/or implementing a full or partial shutdown of pressure systems which may be contributing to the overpressure.

Alternatively, the "action" signal may be a control signal which is inputted to a respective control unit for automated reversionary action, including automated control of a reduction in demand on the gas turbine, and/or automated full or partial shutdown of appropriate pressure systems.

The demand on the gas turbine may be reduced below a separate predetermined threshold level.

It is envisaged that the particular reversionary action will depend upon the nature of the reference temperature, for example whether the reference temperature corresponds to a critical overpressure limit or some other sub-critical overpressure. In the latter case, it is envisaged that the reversionary action will be aimed at avoiding transition to a critical overpressure situation leading to a "burst condition".

Figure 3:
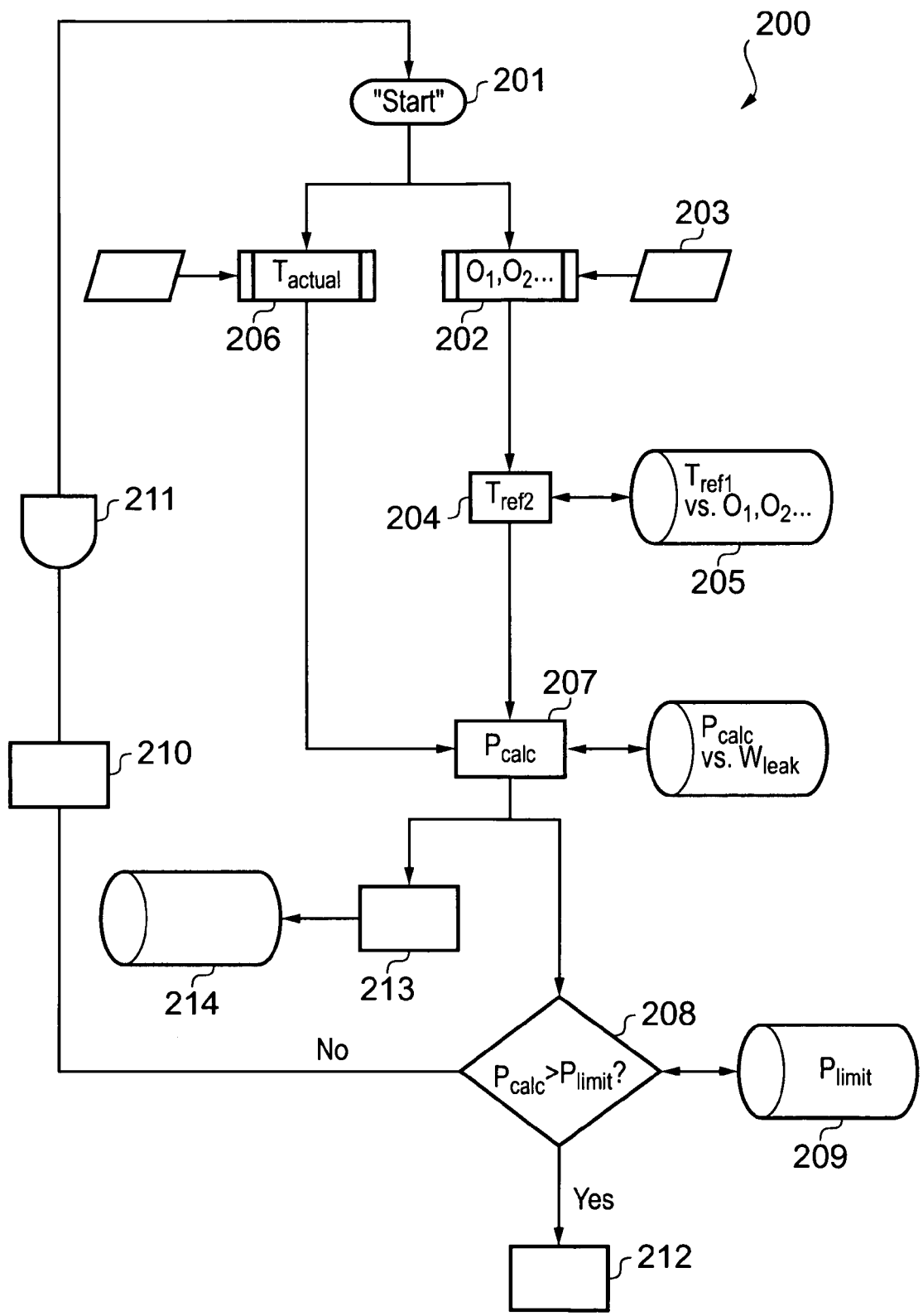
FIG. 3 is a flowchart which illustrates a method according to a second embodiment of the invention.

FIG. 3 shows an alternative method 200 for detecting gas overpressure inside a designated compartment in a gas turbine caused by failure of relevant pressure system for the compartment. Broadly speaking, method 200 uses a reference temperature for the designated compartment along with the measured actual temperature of the compartment and data concerning the nominal operating temperature of the failed pressure system in order to quantify the gas pressure inside the compartment. The quantified gas pressure is then compared to a predetermined gas pressure limit, for example based on a corresponding structural limit for the compartment, in order to determine whether there is an excessive overpressure inside the compartment due to the duct leakage.

More specifically, the method 200 is as follows:

A "Start" command is issued by a control processor 201.

Following issuance of the "Start" command, one or more operating conditions $O_1, O_2 \ldots$ are determined at step 202 on the basis of a corresponding sensor input 203, essentially as described in relation to method 100 above.

At step 204, a reference temperature ($T_{ref2}$) for the designated compartment is determined, this time in the form of a predicted temperature for the compartment, which is retrieved from a suitable look up table 205 storing predicted compartment temperatures for various operating conditions throughout the operational envelope, in accordance with prior test or in-service data.

At step 206, the actual temperature of the designated compartment is measured, essentially as described in relation to method 100 above. Again, suitable temperature sensors may be located in the region of the ventilation outlet of a designated compartment in order to reduce the effects of localised hotspots inside the compartment.

According to method 200, the gas pressure inside the compartment is then assessed as follows:

Firstly, at step 207 the gas pressure inside the compartment is quantified, on the basis of the mass flow leakage into the compartment caused by the pressure system failure.

The mass flow leakage ($W_{leak}$) into the compartment for a given pressure system may be calculated based on the relevant nominal operating temperature of the pressure system, in particular the nominal duct temperature for the pressure system ducts, and the difference between the predicted (reference) compartment temperature and the actual, measured compartment temperature.

Conventional diagnostics may be used initially to identify the failed pressure system, where appropriate; it is envisaged that the nominal duct temperature will then readily be derivable from conventional performance data obtainable as a matter of course for the pressure system, though of course the duct temperature might alternatively be directly measured using a suitable sensor or network of sensors.

In cases where the failed pressure system cannot be identified, a "Worst case scenario" approach may be relied upon, whereby a speculative calculation of the mass flow leakage based on each potential failed pressure system is carried out, and the assessment of gas pressure is carried out on the basis of the highest calculated value for the mass flow leakage.

Following determination of the mass flow leakage, the quantified pressure ($P_{calc}$) inside the compartment is retrieved from a suitable look-up table 207 which stores compartment zone pressures against mass flow leakages for the designated compartment, based on predetermined test and/or in-service data.

At step 208, the determined gas pressure is compared to a gas pressure threshold ($P_{limit}$) stored in a memory file 209.

The gas pressure threshold will generally represent a threshold overpressure inside the compartment, based on corresponding structural limits for the compartment. The threshold may be a critical threshold, beyond which a "burst condition" will occur in the compartment. Alternatively, the threshold may be a sub-critical overpressure threshold, for example 50% of critical overpressure.

If the quantified gas pressure does not exceed the gas pressure limit, indicative of the gas pressure being within acceptable limits, then a corresponding "loop" signal is generated at step 210 for prompting reissue of a "Start" command after a corresponding time delay 211, similar to method 100 described above.

If the quantified gas pressure exceeds the gas pressure limit, indicative of the gas pressure exceeding acceptable limits, then an "action" signal is generated at step 212 for prompting reversionary action in similar manner to method 100.

Thus, the gas pressure is assessed using the reference temperature ($T_{ref2}$) and the measured actual temperature ($T_{actual}$).

In addition to monitoring the gas pressure inside the designated compartment and prompting reversionary action as necessary, the method 200 provides for recordal of quantified gas pressures during an operating period. Thus, at step 213 each quantified gas pressure and/or mass flow leakage may be stored in a suitable log 214 for subsequent retrieval.

It is envisaged that data retrieved from the log 214 could be used during a maintenance check on the respective gas turbine in order to assist with fault diagnosis for the corresponding pressure system (where such system has been identified).

Additionally or alternatively, data retrieved from the log 214 can also be used to schedule maintenance checks for the identified pressure system, where appropriate. For example, if in the turbofan engine 1 of FIG. 1 a faulty burner seal is identified and the fault causes a quantified mass flow leakage into "Zone 3" exceeding a predetermined threshold mass flow leakage (determined in "real time" on-board or following subsequent retrieval and analysis "off-wing"), inspection and replacement of the burner seals may then be scheduled to take place within a suitable interval based on the quantified mass flow leakage. It will be appreciated that in this manner method 200 may be used to detect excessive mass flow leakage caused by a pressure system failure, even where such failure does not specifically cause excessive overpressure in the compartment (so that no "action" signal is generated at step 212). Where an excessive mass flow leakage is detected in "real-time" on-board, a corresponding signal may be generated prompting reversionary action, either by a human operator or under automated control, for example in order to mitigate the level of thermal damage caused by said excessive mass flow leakage.

It will be appreciated that the method according to the present invention provides a "temperature based" analysis of overpressure, and may therefore be implemented without the need for pressure sensors. In particular, the method thus lends itself to convenient implementation using existing temperature sensor systems, which it is envisaged may include temperature sensors forming part of a Fire Detection System for the gas turbine.

At the same time, it is envisaged that the method according to the present invention will eliminate or reduce "gaps" in overpressure detection, thus reducing the required load fatigue resistance for components and allowing for a consequent reduction in weight (and cost) of components used in the respective gas turbine structure. In addition, the need to provide "oversized" ventilation outlets in order to regulate undetected gas overpressure is reduced; it is envisaged therefore that the size of ventilation outlets could be optimised for normal running, thereby reducing noise and drag and potentially improving the structural integrity of the compartment.

The invention claimed is:

1. A method for detecting overpressure inside a compartment associated with a gas turbine nacelle, the method comprising:
   a) measuring one or more predetermined operating conditions nominally affecting the temperature inside the compartment;
   b) determining a reference temperature for the compartment, corresponding to a nominal reference zone pressure, on the basis of the measured operating condition or conditions;
   c) measuring the actual temperature inside the compartment, corresponding to the actual compartment pressure; and
   d) using the measured actual temperature in the compartment and the determined reference temperature for the compartment to assess the gas pressure inside the compartment.

2. A method according to claim 1 for monitoring the pressure inside the compartment during an operating period, the method comprising repeating steps a) to d) at intervals during said operating period.

3. A method according to claim 1, wherein said operating conditions comprise one or more of the ambient atmospheric temperature and the gas turbine operating point.

4. A method according to claim 1, wherein the reference temperature is a temperature threshold and assessing the gas pressure inside the compartment comprises determining whether the actual measured temperature exceeds the temperature threshold.

5. A method according to claim 4 comprising generating a signal for prompting reversionary action to reduce the compartment pressure if the actual temperature or determined pressure exceeds the respective threshold.

6. A method according to claim 5, wherein the method comprises reducing the demand on the gas turbine in response to said signal.

7. A method according to claim 6, wherein demand is reduced below a second threshold level.

8. A method according to claim 6, wherein the signal comprises a control signal inputted to a respective control unit, which control unit consequently controls said reduction in the demand in accordance with said control signal.

9. A method according to claim 1 for detecting overpressure inside the compartment on the basis of failure in a given pressure system, wherein the method comprises determining an operating temperature for the pressure system and
   wherein assessing the gas pressure inside the compartment comprises quantifying mass leakage flow on the basis of said reference temperature, said actual temperature and said operating temperature for the pressure system, and subsequently using the quantified mass leakage flow to determine a gas pressure inside the compartment.

10. A method according to claim 9 for detecting excessive mass leakage flow due to said pressure system failure, comprising comparing said quantified mass leakage flow with a predetermined threshold mass flow leakage.

11. A method according to claim 9, wherein the pressure system comprises a duct and the operating temperature is a nominal duct gas temperature for the pressure system.

12. A method according to claim 11, wherein determining the duct gas temperature comprises measuring one or more operating conditions nominally affecting the duct temperature and determining a nominal duct temperature on the basis of the operating condition or conditions.

13. A method according to claim 12, wherein determining the duct gas temperature comprises measuring the actual duct gas temperature.

14. A method according to claim 9, comprising storing data relating to the quantified mass leakage and/or determined gas pressure for subsequent retrieval.

15. A method according to claim 9, the method comprising assessing whether the determined gas pressure exceeds a threshold overpressure.

16. A method according to claim 15 comprising generating a signal for prompting reversionary action to reduce the compartment pressure if the actual temperature or determined pressure exceeds the respective threshold.

17. A method according to claim 16, wherein the method comprises reducing the demand on the gas turbine in response to said signal.

18. A method according to claim 17, wherein demand is reduced below a second threshold level.

19. A method according to claim 17, wherein the signal comprises a control signal inputted to a respective control unit, which control unit consequently controls said reduction in the demand in accordance with said control signal.

20. A method according to claim 1 for detecting overpressure within a compartment associated with a gas turbine nacelle, wherein the actual compartment temperature is measured in the region of a ventilation outlet in the compartment.

* * * * *